Feb. 2, 1943. W. R. WICKERHAM 2,310,139
SYNCHRONOUS MOTOR CONTROL
Filed Jan. 9, 1941 2 Sheets-Sheet 2

WITNESSES:
E. A. McCloskey
New C. Groome

INVENTOR
William R. Wickerham.
BY
Paul E. Friedemann
ATTORNEY

Patented Feb. 2, 1943

2,310,139

UNITED STATES PATENT OFFICE 2,310,139

SYNCHRONOUS MOTOR CONTROL

William R. Wickerham, Swissvale, Pa., assignor to Westinghouse Electric & Manufacturing Company, East Pittsburgh, Pa., a corporation of Pennsylvania Application January 9, 1941, Serial No. 373,854

7 Claims. (Cl. 172—289)

My invention relates to motor control systems and more particularly to systems for selectively effecting the starting of a synchronous motor with near maximum pull-in torque and the stopping of the motor in the event of pull-out, or the starting of a synchronous motor with near maximum pull-in torque, the stopping of the motor in the event of pull-out and its re-synchronization also at near maximum pull-in torque.

One of the important problems in the starting of synchronous motors is to effect synchronization with no, or at least a minimum, line disturbance, a minimum of shock to the load connected to the motor, and to effect maximum pull-in torque.

Numerous attempts have heretofore been made to solve this problem and with some measure of success. With time limit starting, used in some prior art devices to initiate the control which is to effect maximum pull-in torque, the poorest pull-in torque and maximum line disturbance cannot be avoided. Further, such control takes no account of the fact that a definite time interval has no relation to accelerating time that may be required for a given application.

If current limit control is used the line disturbance is often a maximum for several reasons, one principal reason being the fact that current limit devices, except possibly with equipment of very special and quite expensive design, will not function at a sufficiently low slip. That is, such devices function, as a rule, too soon.

If speed responsive devices are used, it is also not readily possible, except possibly with equipment of very special and quite expensive design, to initiate the pull-in at the maximum induction motor speed. There will thus be line disturbance and maximum pull-in is often not obtained.

One broad object of my invention is to provide for starting a synchronous motor at near maximum pull-in torque and thus near minimum line disturbance.

Another object of my invention is to provide for the direct current excitation of a synchronous motor when it has attained its maximum induction motor speed.

A further object of my invention is to provide for the starting of a synchronous motor with a sequence including all the advantages of time-limit starting, speed responsive starting, and current limit starting without being subject to the disadvantages of these means and methods of starting.

The objects expressly stated hereinbefore are merely illustrative of the novel results, and many other objects of my invention will become more apparent from a study of the following specification when done in conjunction with the accompanying drawings, in which.

Figure 1:
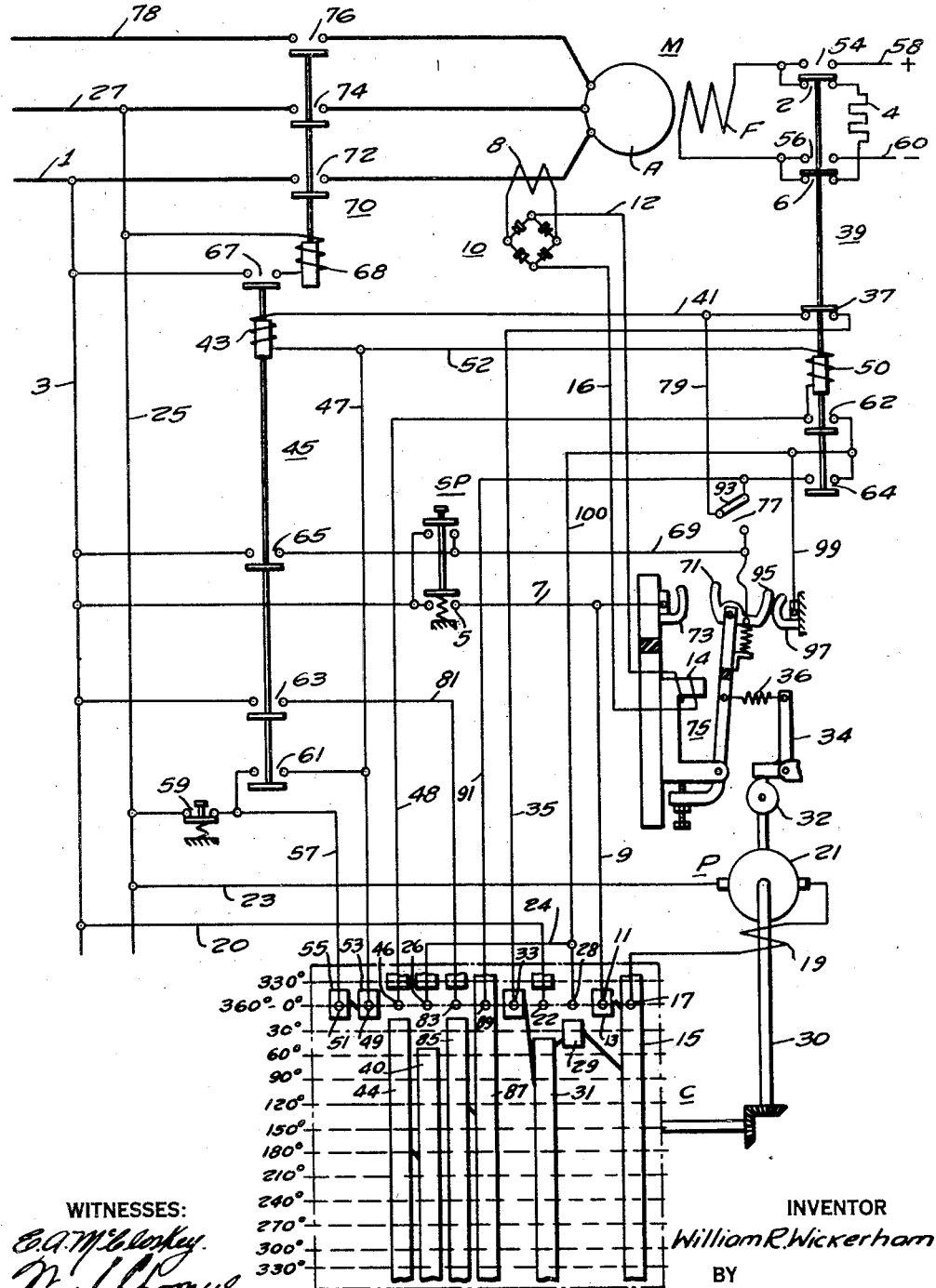
Figure 1 is a diagrammatic showing of my system of control as applied to a synchronous motor.

In Fig. 1, M designates the main synchronous motor that is to be started. This motor is connected to the main buses 1, 27 and 78 by main line contactor 70 and the field F is, in the manner more clearly pointed out hereinafter, connected to the source of direct current supply, indicated by the buses 58 and 60, by the field contactor 39. The field contactor is controlled by the armature current responsive control relay 75, which is in turn subject to a calibrating control effected by the operation of pilot motor P.

The sequence of starting is, broadly stated, as follows: When the main contactor 70 is operated, the motor M will draw a heavy current, say 500% of normal load current (see Fig. 3), and as it accelerates the armature current drops. This armature current variation takes place over an indeterminate period of time. With a control, as mine, that in part takes advantage of the armature current variations to effect the desired sequence of operation, the disadvantage of time-limit acceleration has thus been entirely eliminated.

When the armature current has dropped to a value corresponding to approximately 90% of synchronous speed, the field application time sequence is set in operation. The calibration of relay 75 is continuously so being changed, after 90% of synchronous speed is attained, that when the envelope current of the armature is thereafter for the first time low enough to release relay 75, the relay 75 is operated at a given point of the slip cycle. The field is thus caused to be excited at a time to obtain a high value of pull-in torque. A better understanding of how this is accomplished may, no doubt, be had from a study in detail of a typical starting sequence.

To start the motor M the starting pushbutton, SP, is operated to thus establish a circuit from bus 1 through conductor 3, contact members 5, conductors 7 and 9, contact fingers 11 and 17 bridged by the controller segments 13 and 15 of controller C, field winding 19 and armature winding 21 of the constant speed pilot motor P and conductors 23 and 25 to bus 27.

Another circuit is established from the energized segment 15 through segments 29 and 31 to contact finger 33, conductor 35, back contact members 37 of the field contactor 39, conductor 41, actuating coil 43 of low voltage relay 45, conductor 47, contact fingers 49 and 51 bridged by segments 53 and 55, conductor 57, stop switch 59 and conductor 25 to bus 27.

By the first circuit, the motor P is caused to operate, and this motor begins to drive the drum of the controller C through shaft 30 to move the segments with reference to the contact fingers through an angle of 30°. The motor P also operates a calibrating cam 32.

Since the actuating coil 43 of the low voltage or set-up relay 45 is energized at the same time the motor P is energized, contact members 61, 63, 65 and 67 are closed. The closure of contact member 61 establishes a shunt around the circuit through contact fingers 51 and 49, thereby setting up a holding circuit for coil 43 independent of the position of the controller C.

Closure of contact members 67 establishes an energizing circuit for the actuating coil 68 of the main line contactor 70, thereby effecting the closure of contact members 72, 74 and 76 to thus connect the armature A of motor M to the buses 1, 27 and 78. The motor M will immediately start rotating drawing a heavy current from the main buses. The current transformer 8 will, through rectifier 10, energize the coil 14 through conductors 12 and 16 with a heavy current, thereby causing the control relay armature to pick up, moving the armature counterclockwise to cause disengagement of the contact members 95 and 97 and cause engagement between the contact members 71 and 73. Immediately upon the closure of contact members 71 and 73 a circuit is established from conductor 3 through contact members 65, conductor 69, contact members 71 and 73 to conductor 9 to thus continue to energize the armature 21 but now independent of the position of the starting switch, which may now be released.

After the motor P has operated a short interval of time and before the release of the start switch SP, the controller segment 85 makes contact with contact finger 83. A circuit is thus established from conductor 3 through contact members 63, conductor 81, contact fingers 83 and 89 bridged by the connected controller segments 85 and 87, conductor 91, automatic trip contacts 93 and conductors 79 and 41 to coil 43. The set-up relay 45 thus remains energized for the entire starting cycle.

Figure 3:
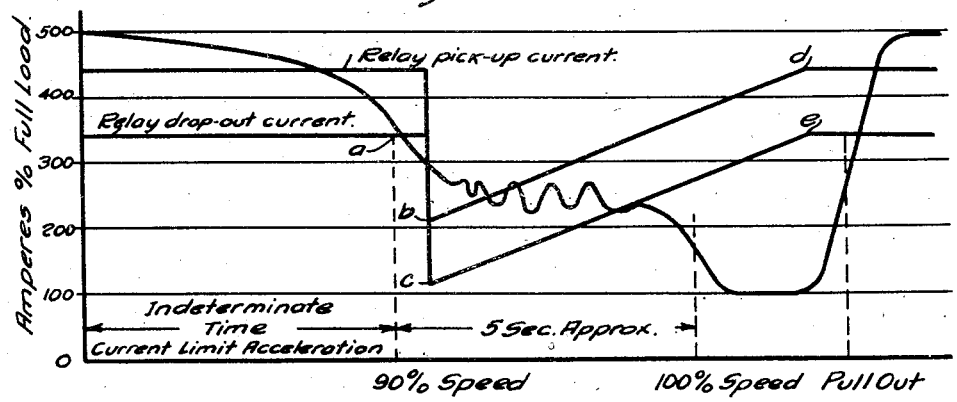
Fig. 3 is a showing of the armature current variations during acceleration, normal operation, and pull-out.

The motor P continues to operate for a short interval of time until it has moved to the 30° position, at which position the motor circuit is broken at contact finger 11 and the motor is thus stopped. During this short interval of operation of motor P, the cam 32 has moved counterclockwise through a small angle, about 30°, but not sufficient to release the bell crank lever 34. The current drawn by the motor, as indicated in Fig. 3, may start at, say, 500% full load and drop as indicated for an indeterminate time interval.

However, since the bell crank lever 34 is on the highest portion of cam 32, the tension of spring 36 is a maximum, and after the motor has attained about 90% of synchronous speed, the armature current will be of insufficient value through coil 14 to hold the armature of relay 75 in the actuated position. In consequence, at about 90% synchronous speed, the spring 36 will move the armature of relay 75 clockwise to thus cause engagement between the contact members 95 and 97.

Immediately a circuit is established from energized conductor 69 through contact members 95 and 97, conductors 99 and 100 to contact finger 28, which will at this stage be in engagement with controller segment 29. Since controller segment 29 is connected to the controller segment 15, the motor P will again be energized and will now begin to operate the controller C at a constant rate. A short interval after it begins to operate segment 31 engages contact finger 22 and a circuit is established from conductor 3 through conductor 20, contact finger 22, segment 31 connected to energized segment 15. The motor P thus continues to rotate, and will continue to do so until the controller C is again in the position shown.

After another short time interval the cam 32 will release the bell crank lever 34, thereby abruptly changing the calibration of relay 75 by decreasing the tension on spring 36 thus effecting the opening of contact members 95 and 97 and the closing of contact members 71 and 73.

In terms of the showing, in Fig. 3, the foregoing steps have this meaning. At the starting of the motor M, the current in coil 14 is above its pick-up value and it picks up. After an indefinite time interval, the current in coil 14 will eventually drop sufficiently to release its armature. Note point $a$ in Fig. 3. The calibration is such that this takes place at about 90% of synchronous speed. The motor P will in the meantime have stopped itself at contact finger 11 and it will thus wait until 90% speed has been attained by motor M.

The relay calibration is changed and its new pickup value drops below the armature current. Note point $b$ in Fig. 3. The circuit for completing the cycle of operation of the motor P is established after the time represented by point $a$ and before the time represented by point $b$.

The motor P, being a constant speed motor, now counts time and thus gradually changes the calibration of the relay 75 as indicated by the slanting lines. The pick-up value changes from point $b$ toward point $d$ and the dropout value changes from point $c$ toward point $e$.

The envelope current in the motor armature will have a lower and lower frequency and at the first instant that this envelope armature current crosses the drop-out curve, the relay armature will be released. Since the release can only take place at a selected low value and since this low value has a definite relation to the position of the pole pieces to the rotating flux, the contact members 95 and 97 may be made to close in some definite relation to the pull-in torque of the motor.

Figure 2:
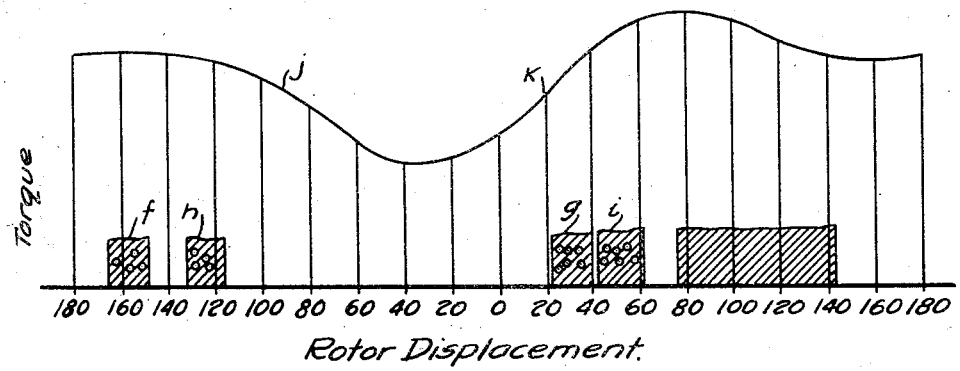
Fig. 2 shows graphically, from test results, the time of operation of my device in relation to the pull-in torque of a synchronous motor.

Fig. 2 shows one actual test result of my invention in relation to the synchronous motor torque. Contact members 95 and 97 close either in the region $f$ or $g$. The closure of contact members 95 and 97 effects the closing of the field contactor 39 and the field excitation is effected in either region $h$ or $i$. It will be noted that this is always not in the lead region between $j$ and $k$. A high pull-in torque in thus attained for every synchronization and at least half the time the very near maximum pull-in torque may be attained.

When contact members 95 and 97 close, a circuit is established from energized conductor 69 through contact members 95 and 97, conductors 99, 100 and 24 to contact finger 26, segments 40 and 44, contact finger 46, conductor 48, actuating coil 50 of the field contactor 39, and conductor 52 to the energized conductor 47.

Operation of the field contactor effects the closing of contact members 54 and 56 to connect the field F to the direct current buses 58 and 60. An instant later contact members 2 and 6 are opened to disconnect the field discharge resistor 4 from the field F.

Since contact members 95 and 97 now remain closed the energized conductor 99 is connected, through contact members 62, to coil 50 and the field contactor remains energized.

It is, of course, also important that surges of motor armature current do not upset the completion of the starting cycle. If the contact members 95 and 97 are closed and a surge occurs, they will again open. The field contactor 39 remains closed, however, as long as the motor P has not yet moved the controller to the position shown. The circuit shunting the contact members 95 and 97 may be traced from conductor 3 through contact members 63, conductor 81, contact fingers 83 and 89 bridged by the connected segments 85 and 87, conductor 91, contact members 64 and 62 to coil 50.

The motor P continues to rotate until the controller C again holds the position shown and thus stops itself.

The automatic trip circuit is represented by the closed condition at 93. The circuit for coil 43 under these conditions is from energized conductor 3 through contact members 65, conductor 69, contact members 95 and 97, conductor 99, contact members 64, automatic trip contacts 93, conductors 79 and 41, coil 43, conductor 47, contact members 61, stop switch 59 to bus 25.

In the event of a pull-out coil 14 is heavily energized and the circuit for coils 43 and 50 are opened at contact members 95 and 97. The result is that the motor field F is deenergized and also that the set-up relay 45 opens the circuit for the main line contactor at contact members 67 and the main motor stops. The motor will not resynchronize except switch SP be again operated.

If the circuit is closed at 77 then my system of control is set for automatic resynchronization in the event of a pull-out. Under this condition, coil 43 is energized from conductor 3 through contact members 65, conductors 69, closed circuit at 77, conductors 79 and 41 to coil 43. Set-up relay 45 thus remains energized independent of a pull-out. What a pull-out does, however, is to open the circuit for coil 50 at contact members 95 and 97 to thus remove the excitation from the field F and also start the motor P by the closure of contact members 71 and 73. The motor circuit may be traced from conductor 3 through contact members 65, conductor 69, contact members 71 and 73, conductor 9, contact fingers 11 and 17 bridged by the connected segments 13 and 15, field 19, motor P, and conductor 23 to energized control bus 25. The resynchronization then proceeds exactly as for any first synchronization.

The specific circuit arrangement I have shown and described is illustrative of my invention and is not to be taken in a limiting sense, because others skilled in the art, particularly after having had the benefit of the teachings of my disclosure may devise other circuits for accomplishing similar results. My invention is only to be limited by the scope of the claims hereto appended.

I claim as my invention:

1. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; a relay having an armature and having its actuating coil for operating the armature connected to be responsive to the envelope current in the motor armature windings, biasing means for biasing the relay armature to its unactuated position by a relatively large force but still considerably less than the force produced by the actuating force of the actuating coil during initial starting of the motor, whereby the relay armature is released to its unactuated position at a predetermined decrease in the armature current, means set in operation by the release of the relay armature to effect, a short time after the release of the armature, by its progressive action an abrupt decrease in the biasing force produced by the biasing means, to thus effect a movement of the relay armature to its actuated position, and thereafter a gradual increase of the biasing force of the biasing means, whereby the relay armature is released at an instant when the force of the actuating coil at some minimum value of the variation of the envelope current in the armature becomes less than the gradually increasing force of the biasing means, whereby the relay armature is released at an instant when the field windings hold a given position with reference to the rotating field in the armature; and means responsive to this said last release of the relay armature for effecting the operation of the field switching means.

2. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; a relay; an actuating coil for the relay, said actuating coil being so connected to the armature windings of the motor to be responsive to the envelope current of the motor armature; calibrating means, set in operation by a drop-out of said relay at a predetermined drop in envelope armature current, adapted to increase the sensitiveness of said relay so that it becomes responsive to the frequency of the envelope current whereby said relay is caused to again pick up and then drop out at a low current point of a low frequency of the envelope current; and means, responsive to the last mentioned drop-out of the relay, for effecting operation of the field switching means.

3. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; a relay responsive to the envelope current in the armature windings of the motor; calibrating means for changing the calibration of the relay from one drop-out value to another drop-out value a time interval after said relay drops out because of a predetermined drop in armature current after energization of the motor armature with alternating current, whereby said relay again picks up, said calibrating means being operable to gradually change the calibration, after the abrupt change in calibration, back to the original value whereby said relay is again caused to drop out at a low slip frequency of the envelope current and at an instant when said low slip frequency current passes through some minimum instantaneous value whereby the relay drops out at an instant when the field windings hold a given position in relation to the rotating flux in the armature winding; and means responsive to said last drop-out of said relay adapted to effect operation of the field switching means.

4. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; a relay having an actuating coil, a spring, an armature operated by said coil to an actuated position and biased by the spring to unactuated position; a transformer connected in the motor armature circuit; rectifying means connected to the transformer, whereby the output of the rectifier varies as a function of the slip frequency of the motor; means for connecting the relay coil to the rectifier, whereby the relay armature is moved to its actuated position at the starting of the motor as an induction motor, and, through the action of the biasing spring, moves to its unactuated position when the motor has attained a relatively high speed, as a speed in the neighborhood of 90% of synchronous speed; time limit means adapted to abruptly decrease the tension of the biasing spring a short time interval after the movement of the relay armature to its unactuated position to again cause the armature to move to its actuated position; means, responsive to the operation of the said time limit means, adapted to gradually increase the tension of the biasing spring to effect the release of the relay armature to its unactuated position at some minimum point of the low slip frequency current in the relay actuating coil; and means, responsive to the time limit means and this said last mentioned movement of the armature to its unactuated position, for effecting operation of the field switching means.

5. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; armature current responsive means operable upon a decrease of the initial starting armature current to a predetermined value, time delay means set in operation by the operation of the armature current responsive means, and motor slip frequency responsive means, which time delay means, upon completion of a predetermined time delay, sets said slip frequency responsive means in operation to effect the operation of the field switching means.

6. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; relay means operable at a given slip frequency of the motor armature current variations; time limit means set in operation by said relay means; means responsive to the operation of the said time limit means adapted to abruptly change the operating characteristics of said relay means to cause it to go through a second cycle of operation; and means, responsive to the said second cycle of operation of the said relay means, for effecting the operation of said field switching means.

7. In an electric starting control system for a synchronous motor, in combination, a synchronous motor having conventional starting windings, armature windings, and field windings; a source of alternating current; switching means for connecting the armature windings to the source of alternating current to start the operation of the motor, by means of the starting windings, as an induction motor; a source of direct current; field switching means for connecting the field windings to the source of direct current, and control means for controlling the instant of operation of the field switching means, said control means comprising; relay means operable at a given slip frequency of the motor armature current variations; time limit means set in operation by said relay means; means responsive to the operation of the said time limit means adapted to successively abruptly and then gradually change the operating characteristics of said relay means to cause it to go through a second cycle of operation; said gradual change in operating characteristic being effective to cause the second portion of the operating cycle of said relay to take place at an instant when the field windings hold a given position to the rotating flux in the armature winding, and means, responsive to the said second cycle of operation of the said relay means, for effecting the operation of said field switching means.

WILLIAM R. WICKERHAM.